United States Patent
He et al.

(10) Patent No.: US 12,548,330 B1
(45) Date of Patent: Feb. 10, 2026

(54) DETERMINING ENGAGEMENT USING SENSOR DATA

(71) Applicant: Upwork Inc., San Francisco, CA (US)

(72) Inventors: Yihui He, Pittsburgh, PA (US); Megan Hardy, Oakland, CA (US); Bryan Innes, San Francisco, CA (US); Julian Green, San Francisco, CA (US); Andrew Rabinovich, San Francisco, CA (US)

(73) Assignee: Upwork Inc., West Valley City, UT (US)

( * ) Notice: Subject to any disclaimer, the term of this patent is extended or adjusted under 35 U.S.C. 154(b) by 70 days.

(21) Appl. No.: 18/100,863

(22) Filed: Jan. 24, 2023

Related U.S. Application Data

(60) Provisional application No. 63/303,415, filed on Jan. 26, 2022.

(51) Int. Cl.
*G06V 20/40* (2022.01)
*G06V 10/82* (2022.01)

(52) U.S. Cl.
CPC .............. *G06V 20/41* (2022.01); *G06V 10/82* (2022.01)

(58) Field of Classification Search
CPC ................................ G06V 20/41; G06V 10/82
See application file for complete search history.

(56) References Cited

U.S. PATENT DOCUMENTS

| | | | |
|---|---|---|---|
| 11,122,240 B2* | 9/2021 | Peters | G06V 20/41 |
| 11,158,121 B1 | 10/2021 | Tung | |
| 11,290,686 B2 | 3/2022 | Peters et al. | |
| 2013/0101002 A1 | 4/2013 | Gettings | |
| 2018/0253865 A1 | 9/2018 | Price | |
| 2020/0334789 A1 | 10/2020 | Zhang | |
| 2020/0342572 A1 | 10/2020 | Chen | |

(Continued)

OTHER PUBLICATIONS

Archibald et al., "Using Zoom Videoconferencing for Qualitative Data Collection: Perceptions and Experiences of Researchers and Participants," International Journal of Qualitative Methods, 2019, 18:1-8.

(Continued)

*Primary Examiner* — Olisa Anwah
(74) *Attorney, Agent, or Firm* — Haverstock & Owens, A Law Corporation

(57) ABSTRACT

Methods, systems, and apparatus, including computer programs encoded on computer storage media, for predicting engagement. One of the methods is a method of determining an engagement score for each of a plurality of participants in a video conference call, and includes, for each of the plurality of participants: receiving an encoded video stream of the participant, the encoded video stream representing an encoding of a sequence of one or more video frames; decoding the encoded video stream to determine the sequence of video frames; for each of a plurality of engagement categories representing respective different modes by which the participant may be engaged in the conference call, processing one or more respective video frames from the sequence of video frames to generate a sub-score for the engagement category; and combining the sub-scores for the plurality of engagement categories to generate the engagement score for the participant.

20 Claims, 6 Drawing Sheets

(56) References Cited

U.S. PATENT DOCUMENTS

| | | |
|---|---|---|
| 2020/0364872 A1 | 11/2020 | Shelns |
| 2021/0092462 A1 | 3/2021 | Cox |
| 2021/0150278 A1 | 5/2021 | Dudzik |
| 2021/0250547 A1 | 8/2021 | Jiang |
| 2021/0281867 A1 | 9/2021 | Golinski |

OTHER PUBLICATIONS

O'Flaherty et al., "The use of flipped classrooms in higher education: a scoping review," The Internet and Higher Education, Apr. 2015, 25:85-95.

Lopez-Tapia, Santiago. " Gated Recurrent Networks for Video Super Resolution", EUPISCO 2020. 700-704. (Year:2020).

Wenzhe Shi et al. "Real-Time Single Image and Video Super-Resolution Using an Efficient Sub-Pixel Convolutional Neural Network." 2016 IEE Conference on Computer Vision and Pattern Recognition (CVPR). IEEE, 2016. 1874-1883. (Year:2016).

Yulin Wang; Glance and Focus: a Dynamic Approach to Reducing Spatial Redundancy in Image Classification ( Year: 2020).

\* cited by examiner

DETERMINING ENGAGEMENT USING SENSOR DATA

CROSS-REFERENCE TO RELATED APPLICATIONS

This application claims the benefit under 35 U.S.C. § 119(e) of the filing date of U.S. Patent Application No. 63/303,415, for "Predicting Engagement Using Machine Learning" which was filed on Jan. 26, 2022, and which is incorporated here by reference in its entirety.

BACKGROUND

Aspects of this specification relate to neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that automatically determines the engagement of a user in an interaction (e.g., an interaction with one or more other users and/or with a computer program) e.g., based on sensor data captured of the user.

In this specification, the "engagement" of a user in an interaction represents a degree to which the user is paying attention and/or actively participating in the interaction. For example, if the user is a participant in a video conference call with one or more other users, then the user can be considered to have a high engagement in the call if the user is speaking to the other participants on the call, making a visible gesture such as a head nod or a thumbs-up, and/or looking directly at a display on which the video call is being presented.

The engagement of a user in an interaction can be represented using an "engagement score" having one or more numerical values. In some implementations, the engagement score of a user in an interaction can include or be generated from multiple engagement sub-scores corresponding to respective different modes by which the user may be engaged with the interaction. To continue the above example of a user participating in a video conference call, a first sub-score of the user can identify whether the user is speaking, a second sub-score can identify whether the user is making a visible gesture, and a third sub-score can identify whether the user is looking directly at the display.

The engagement score for a user in an interaction can be generated from sensor data captured of the interaction. For example, if the user is a participant in a video conference call, then the engagement score can be generated from video frames depicting the user and/or corresponding audio data. In some implementations, a system can further use "interaction data" representing the user's interaction with a computer system during the interaction. For example, the interaction data can identify a degree to which the user is interacting with the computer program supporting the video conference call, e.g., by tapping a touch-screen of a device running the program or using a computer mouse to click within the program. As a particular example, the interaction data may indicate whether the user is "screensharing," i.e., transmitting image data depicting the display of a user device of the user to the other participants on the video conference call.

The engagement score of a user in an interaction can represent the engagement of the user at a particular time point of the interaction. For example, a system configured as described in this specification can periodically (e.g., on the order of every hundredth of a second, every tenth of a second, every second, or every ten seconds) generate a new engagement score for the user throughout the interaction. In some implementations, after the interaction has concluded, the system can determine an "overall engagement score" for the user that represents the aggregate degree to which the user was engaged throughout the interaction. For example, the system can combine the respective engagement scores generated at each of the time points throughout the interaction (e.g., by determining an average) to generate the overall engagement score.

In some implementations, a system configured as described in this specification can determine the collective engagement of each of the participants in an interaction at a particular time point, generating a "collective engagement score." For example, the system can combine the respective engagement scores for the participants (e.g., by determining an average) to generate the collective engagement score. In some such implementations, after the interaction has concluded, the system can determine an "overall collective engagement score" that represents the aggregate degree to which all of the participants were engaged throughout the interaction. That is, the overall collective engagement score can represent the degree to which the interaction was successful in maintaining the attention and participation of each of the participants throughout the course of the interaction.

The subject matter described in this specification can be implemented in particular embodiments so as to realize one or more of the following advantages.

During an interaction, it can be useful for participants in the interaction to get real-time feedback regarding how engaging the interaction is. Using techniques described in this specification, a system can predict engagement in an interaction between multiple participants in a real-time setting. That is, the system can predict engagement while minimizing the latency introduced by the prediction, so that users can perceive the interaction to be truly real-time. As particular examples, the system can reduce latency (i.e., the amount of time between (i) a first time point when the device of a first user sends a signal and (ii) a second time point when the device of a second user receives the signal) to below 100 ms, below 50 ms, or below 10 ms. In certain implementations, processing can happen at 10 Hz.

In some implementations described in this specification, a system can predict the engagement of a participant based on multiple different engagement categories. Using any single engagement category to predict engagement might not be as accurate as using multiple engagement categories because collectively multiple different engagement categories can be leveraged by the system to determine more accurately the level of engagement of the participant. For example, if the participant is in a video conference call and is looking away from the display, then that might indicate that the user is not engaged. However, if the user is simultaneously speaking while making a hand gesture, then the system can determine that the participant in fact is engaged, and perhaps merely looked away from the screen to collect their thoughts.

In some implementations described in this specification, a system can generate respective sub-scores for the multiple engagement categories in parallel, further reducing the latency in the interaction introduced by the system. In some such implementations, a single neural network can process sensor data from the interaction to generate multiple different engagement sub-scores, reducing the computational cost of the system. In interactions with many participants where engagement for each participant is predicted at high frequency (e.g., multiple times per second), this reduced computational cost can significantly reduce the monetary operational cost of the system.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a system that automatically determines the engagement of participants in an interaction based on sensor data captured of the interaction.

For example, the system can be configured to determine the engagement of participants in a video conference call using the respective video streams of the participants.

As another example, the system can be configured to determine the engagement of audience members in an audience of a live performance using video data depicting the audience captured during the performance. The performers of the live performance can then use the predicted engagement to improve the live performance, e.g., to identify points in the live performance that are engaging and other points that are not engaging.

As another example, the system can be configured to determine the engagement of audience members in an audience of a movie screening using video data depicting the audience captured during the movie screening. The producers of the movie can then use the predicted engagement to determine whether the movie is enjoyable to audiences.

As another example, the system can be configured to determine the engagement of a user of a computer program, e.g., a computer program that instructs the user in a safety course, e.g., a workplace safety training program. The developers of the computer program can use the predicted engagement to improve the computer program, e.g., to determine whether the safety course properly engages the users in order to teach the necessary lessons.

As another example, the system can be configured to determine the engagement of a user who is playing of a computer game. The developers of the computer game can use the predicted engagement to determine whether users enjoy playing the computer game.

Although the description below often refers to determining the engagement of a video conference call, it is to be understood that the same techniques can be applied to any appropriate use case.

Figure 1:
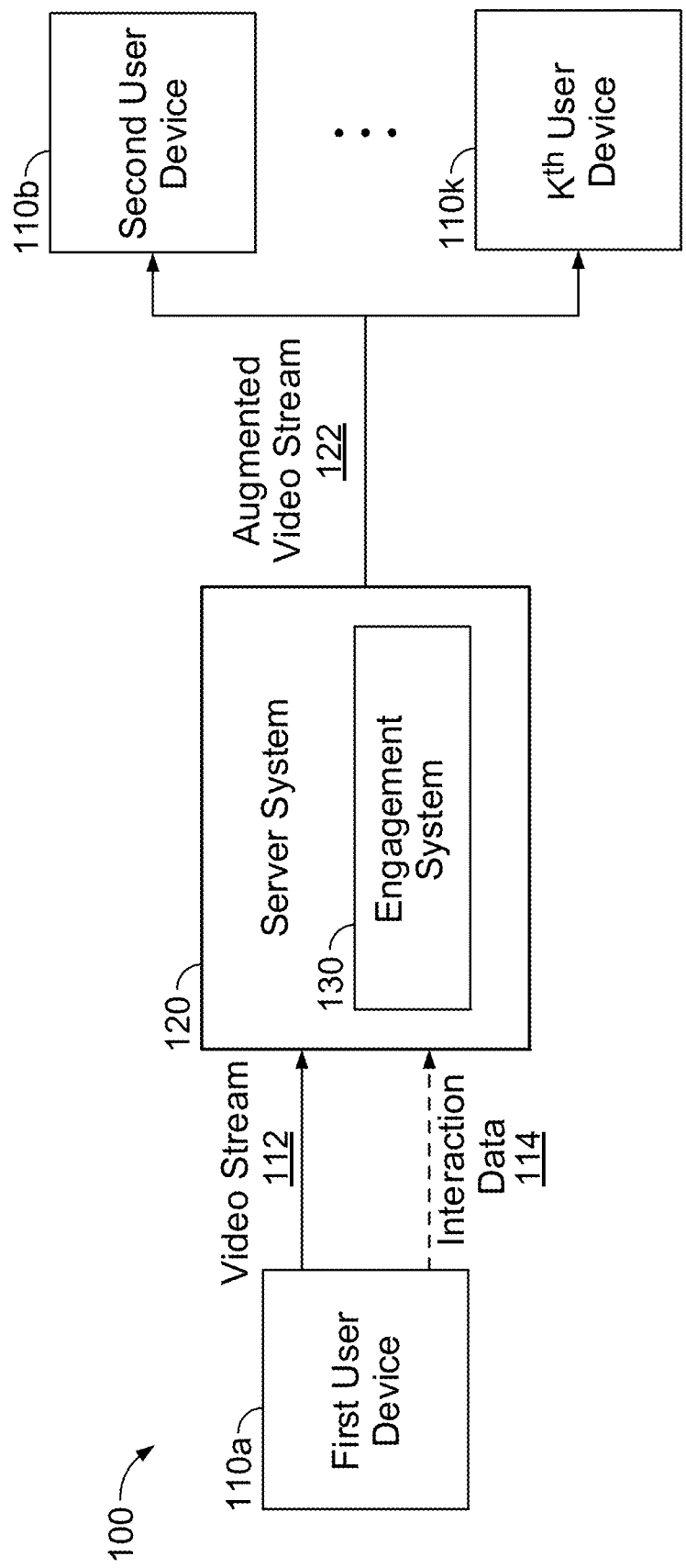
FIG. 1 is a block diagram of an example system that includes user devices and a server system.

FIG. 1 is a block diagram of an example system 100 that includes k user devices 110a-k and a server system 120. The system 100 is an example of a system implemented as computer programs on one or more computers in one or more locations in which the systems, components, and techniques described below are implemented.

The k user devices 110a-k are communicatively connected via the server system 120, where k>1. In particular, a first user device 110a of the k user devices 110a-k is configured to transmit a video stream 112 to each of the other user devices of the k user devices 110a-k via the server system 120.

In some implementations, one or more of the other user devices 110a-k are also configured to transmit respective other video streams, e.g., concurrently with the first user device 110a transmitting the video stream 112. For example, each of the k user devices 110a-b can be participants in a video conference call. For simplicity, in FIG. 1 only the first user device 110a is depicted as transmitting a video stream 112, but it is to be understood that the same techniques can be executed for each of multiple user devices.

In this specification, a video stream is a video that is captured by a first user device and communicated to a second user device in real time. That is, as the first user device captures video frames of the video, the first user device communicates the video frames to the second user device. In some implementations, different devices capture and communicate the video stream. That is, a first device (e.g., a camera or webcam) can capture the video frames and a second device (e.g., a laptop or desktop) that is local to the first device can communicate the video frames. In some implementations, the video stream includes audio data captured concurrently with the video frames of the video stream.

The server system 120 is a non-local computing system having one or more computing nodes, e.g., hundreds or thousands of distributed computing nodes, in one or more locations. The server system 120 can be communicatively connected to the user devices 110a-k by any appropriate form or medium of digital data communication, e.g., a communication network. Examples of communication networks include a local area network (LAN) and a wide area network (WAN), e.g., the Internet.

The server system 120 includes an engagement system 130 that is configured to process the video stream 112 and to determine the respective engagement of one or more users depicted in the video stream 112. For example, if the users of the user devices 110a-k are engaged in a video conference call, then the video stream 112 may depict a single participant in the video conference call, and the engagement system 130 can process the video stream to determine the engagement of the participant in the video conference call.

In particular, the engagement system 130 can generate an engagement score representing the engagement of the participant. For example, the engagement score can be a single value between 0 and 1 where a value of 1 indicates full engagement with the video conference call and the value of 0 represents no engagement at all with the video conference call. As another example, the engagement score can be a single value between 0 and n (e.g., between 0 and 2), where a higher value indicates higher engagement with the video conference call. As another example, the engagement score can be represented by a set of values, e.g., where each corresponds to a respective different engagement category. Engagement categories are discussed in more detail below.

In some implementations, the engagement system 130 processes both the video frames of the video stream 112 and audio data of the video stream 112 to generate the engagement score. In some other implementations, the engagement system 130 only processes video frames of the video stream 112 to generate the engagement score, e.g., in cases in which the video stream 112 does not include associated audio data.

In some implementations, the first user device 110*a* also provides interaction data 114 to the server system 120. The interaction data 114 represents interactions by the one or more users with the first user device 110*a*, i.e., user inputs provided by the one or more users to the first user device 110*a*. Examples of interaction data 114 are discussed below with reference to FIG. 2. In these implementations, the server system 120 can process the interaction data 114 along with the video stream 112 to generate the engagement score for the video stream 112.

In some implementations, the video stream can depict multiple different users, and the engagement system 130 is configured to determine the respective engagement of each of the multiple different users, and/or an aggregate engagement of the multiple different users. This process is described in more detail below with reference to FIG. 2.

After determining the engagement of the one or more users depicted in the video stream 112, the server system 120 can encode data representing the determined engagement into the video stream 112 (e.g., by encoding the generated engagement score into the video stream 112), generating an augmented video stream 122. The server system 120 can then provide the augmented video stream 122 to the other user devices 110*b-k*.

In some implementations in which each of multiple user devices of the k user devices 110*a-k* transmit respective video streams, the engagement system 130 can generate a respective engagement score corresponding to each of the transmitted video streams. The server system 120 can then encode each of the respective engagement scores into the video stream 112 to generate the augmented video stream 122.

In some such implementations, the engagement system 130 can further determine a collective engagement score representing the engagement of each of the users depicted in the respective transmitted video streams. The server system 120 can then encode the collective engagement score into the augmented video stream 122. In some such implementations, the server system 120 only encodes the collective engagement score into the augmented video stream 122, i.e., does not encode each of the individual engagement scores corresponding to respective transmitted video streams. Thus, the user devices 110*b-k* that receive the augmented video stream 122 only have access to the collective engagement score and not the individual engagement scores.

Upon receiving the augmented video stream 122, each of the other user devices 110*b-k* can display (i) the video frames of the augmented video stream 122 (e.g., the original video frames of the video stream 112) and (ii) data representing the engagement score of the first user device 110*a* (and/or data representing the collective engagement score, as described above). For example, each of the other user devices 110*b-k* can display the video frames of the augmented video stream 122 in a first portion of a user interface, and one or more visual indicators of the engagement score of the first user device 110*a* (and/or the collective engagement score) in a second portion of the user interface. Example visual indicators are discussed below with reference to FIG. 3.

In some implementations, the server system 120 modifies the video frames of the video stream 112 before generating the augmented video stream 122, e.g., by performing a super-resolution technique to increase the resolution of the video frames, such that the other user devices 110*b-k* can display the video frames of the augmented video stream 122 having a higher resolution than the video frames of the original video stream 112.

In some implementations, the engagement system 130 is a component of the first user device 110*a*. That is, the first user device 110*a* can be configured to determine the engagement of the one or more users from one or more video frames of the video stream 112 before transmitting the one or more video frames of the video stream 112. The first user device 110*a* can then encode the determined engagement directly in the video stream 112, and transmit the video stream 112. In these implementations, the server system 120 can then simply direct the video stream 112 to the appropriate other user devices 110*b-k*. In some such implementations, e.g., in some implementations in which the user devices 110*a-k* are connected in a local area network, the system 100 does not include a non-local server system 120 at all.

Figure 2:
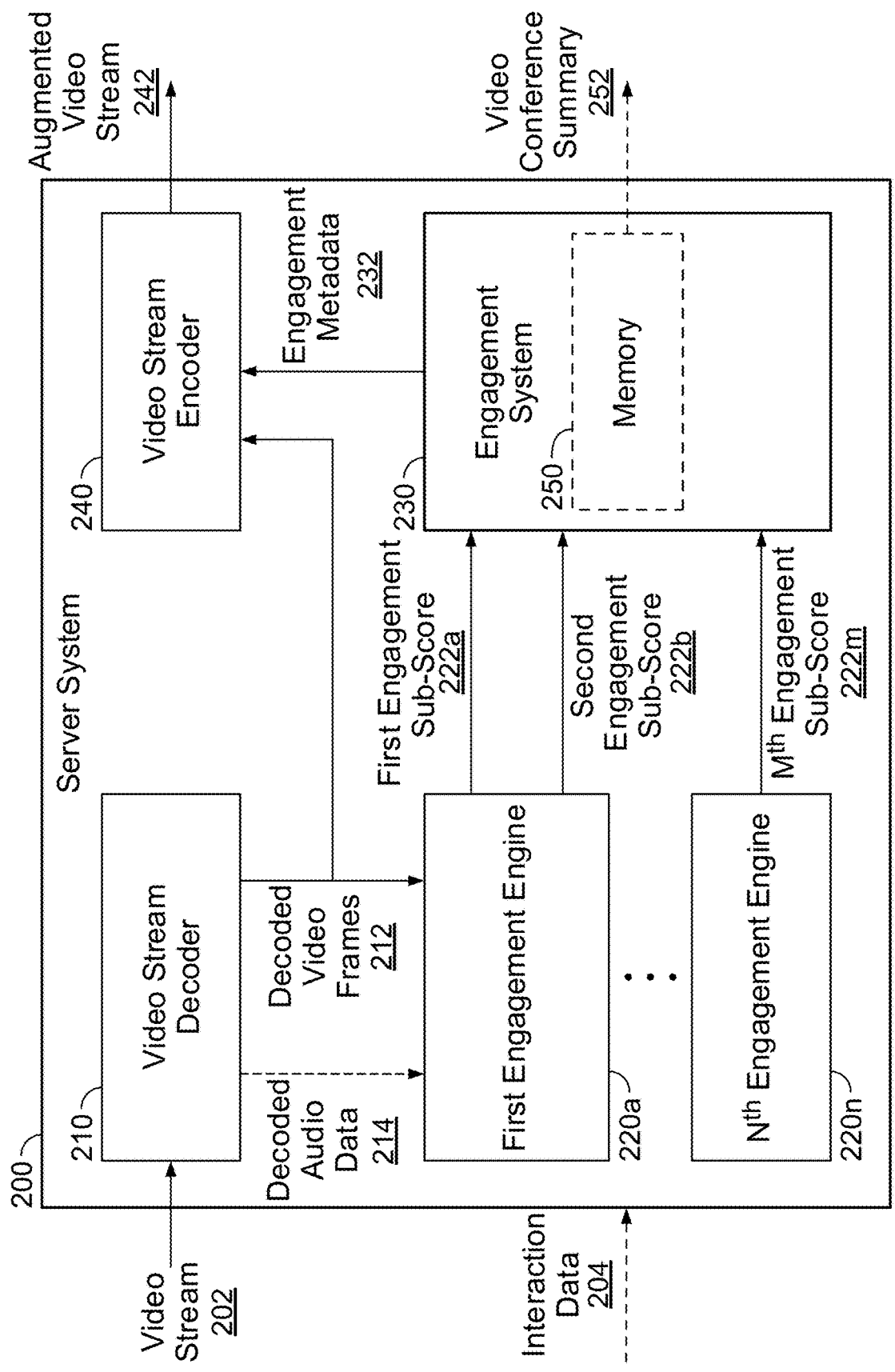
FIG. 2 is a block diagram of an example server system.

FIG. 2 is a block diagram of an example server system 200. The server system 200 is an example of a system implemented as computer programs on one or more computers in one or more locations in which the systems, components, and techniques described below are implemented.

The server system 200 is configured to receive a video stream 202 from a first user device and to process the video stream 202 to determine the engagement of one or more users depicted in the video stream 202. The engagement of the one or more users can be represented by an engagement score. The server system 200 can then encode engagement metadata 232 generated from the engagement score into the video stream 202 to generate an augmented video stream 242, and provide the augmented video stream 242 to one or more second user devices. For example, users of the first user device and one or more second user devices can be participants in a video conference call.

The server system 200 includes a video stream decoder 210, a set of n engagement engines 220*a-n* (n≥1), an engagement system 230, and a video stream encoder 240.

The video stream decoder 210 is configured to decode the video stream 202 and to generate a sequence of decoded video frames 212. That is, the video stream 202 is a binary representation of a video having a sequence of frames 212, and the video stream decoder 210 is configured to process the binary signal to recover the decoded video frames 212 from the video stream 202 (i.e., to recover, for each video frame 212, respective pixel data representing intensity values of the pixels of the video frame). The video stream 202 can be encoded using any appropriate video codec, e.g., the H.264 format (also called Advanced Video Coding, or AVC), the VP9 format, the H.265 format (also called High Efficiency Video Coding, or HEVC), the AV1 format, or the H.266 format (also called Versatile Video Coding, or VVC).

In implementations in which audio data 214 of the video stream 202 is processed by respective engagement engine 220*a-n* to generate the engagement score for the video stream 202, the video stream decoder 210 can also decode the video stream 202 to generate the decoded audio data 214. The audio of the video stream 202 can be encoded using any appropriate audio codec, e.g., MP3, Advanced Audio Coding (AAC), or Waveform Audio File Format (WAV).

Each of the n engagement engines 220a-n corresponds to a respective different set of one or more engagement categories. Each engagement category represents a respective different mode by which the one or more users depicted in the video stream 202 may be engaged in the video conference call.

Each engagement engine 220a-n is configured to process the decoded video frames 212 (i.e., process the intensity values of the pixels of the decoded video frames 212) and/or the decoded audio data 214 to generate a respective engagement sub-score 222a-m for each engagement category in the set of engagement categories corresponding to the engagement engine 220a-n. The engagement sub-score 222a-m for each engagement category represents the degree to which the one or more users depicted in the video stream 202 are engaged according to the mode represented by the engagement category. Example modes and corresponding engagement categories are discussed below. In other words, the n engagement engines 220a-n are configured to generate m engagement sub-scores 222a-m, m≥n.

In some implementations in which the video stream 202 depicts multiple users, each engagement engine 220a-n can generate a single engagement sub-score 222a-m, collectively representing the engagement of the multiple users, for each engagement category in the corresponding set. In some other such implementations, each engagement engine 220a-n can generate a respective different engagement sub-score 222a-m for each of the multiple users, representing the engagement of the single respective user, for each engagement category in the corresponding set. For example, the server system 200 can process the decoded video frames 212 using a machine learning model configured to detect users (e.g., a neural network configured through training to detect faces of users). Then, for each detected user, the server system 200 can determine the portions of the decoded video frames 212 depicting the detected user and process the determined portions using the engagement engines 220a-n. For simplicity, the below description refers to generating engagement sub-scores 222a-m for a single user depicted in the video stream 202.

In some implementations, each engagement engine 220a-n corresponds to a single engagement category, i.e., m=n. For example, an engagement engine 220a-n can process the decoded video frames 212 (and/or the decoded audio data 214) according to a set of predetermined heuristics to generate the single engagement sub-score 222a-m corresponding to the engagement engine 220a-n. As another example, an engagement engine 220a-n can process the decoded video frames 212 (and/or the decoded audio data 214) using a trained machine learning model, e.g., a trained neural network, to generate the single engagement sub-score 222a-m corresponding to the engagement engine 220a-n.

In some other implementations, at least one engagement engine 220a-n corresponds to multiple different engagement categories, i.e., m>n. For example, a particular engagement engine 220a-n can be configured to process the decoded video frames 212 (and/or the decoded audio data 214) using a single neural network that has been configured through training to generate multiple different engagement sub-scores 222a-m. Example network architectures for neural networks configured to generate multiple different engagement sub-scores 222a-m are discussed below with reference to FIG. 5. Processing the decoded video frames 212 using a single neural network to generate multiple different engagement sub-scores 222a-m can improve the efficiency of the server system 200, reducing the time and computational resources required to generate the augmented video stream 242.

In some implementations, the server system 200 is configured to obtain, from the first user device that provided the video stream 202, interaction data 204 representing interactions by the user depicted in the video stream 202 with the first user device. One or more of the engagement engines 220a-n can then process the interaction data 204 to generate the corresponding engagement sub-scores 222a-m, instead of or in addition to processing the decoded video frames 212.

In some implementations, different engagement engines 220a-n process sequences of decoded video frames 212 having different lengths (and/or sequences of audio data 214 having different lengths). That is, the server system 200 can provide different decoded video frames 212 to different engagement engines 220a-n at different frequencies.

In some implementations, the server system 200 can execute each of the n engagement engines 220a-n in parallel, reducing the time required for the server system 200 to generate the augmented video stream 242.

Some examples of engagement categories and corresponding engagement sub-scores 222a-m are provided.

One of the engagement categories can be a "facial expression" category whose engagement sub-score 222a-m represents a degree to which the facial expression of the user indicates that the user is engaged in the video conference call. The engagement engine 220a-n corresponding to the facial expression category can process one or more of the decoded video frames 212 using a trained neural network to generate the corresponding engagement sub-score 222a-m.

In some implementations, the neural network has been configured through training to process the one or more decoded video frames 212 to generate two values: a valence value and an arousal value. The valence value can represent a degree to which the facial expression of the user is positive, e.g., where lower valence values indicate a negative facial expression (e.g., characterized by a frown or a furrowed brow) and higher valence values indicate a positive facial expression (e.g., characterized by a smile or laugh lines around the eyes). The arousal value can represent an intensity of the emotion indicated by the facial expression of the user, e.g., where lower arousal values indicate a less intense emotion and higher arousal values indicate a more intense emotion.

The engagement engine 220a-n can then combine the valence value and the arousal value to generate the corresponding engagement sub-score 222a-m. For example, the engagement engine 220a-n can multiply the two values together; that is, the degree to which the facial expression is positive (as represented by the valence value) is weighted by the intensity of the emotion (as represented by the arousal value). As another example, the valence value and arousal value can both be integer values, and the engagement engine 220a-n can combine the two values according to a predetermined mapping between the two value and the corresponding engagement sub-score 222a-m. As a particular example, the valence value and arousal value can both take a value of either 0, 1, or 2, and the predetermined mapping can be defined by the following table:

| Valence Value | Arousal Value | Engagement Sub-Score |
|---|---|---|
| 0 | 0 | 0 |
| 1 | 0 | 1 |
| 2 | 0 | 1 |
| 0 | 1 | 1 |

-continued

| Valence Value | Arousal Value | Engagement Sub-Score |
|---|---|---|
| 1 | 1 | 1 |
| 2 | 1 | 1 |
| 0 | 2 | 0 |
| 1 | 2 | 1 |
| 2 | 2 | 2 |

Another engagement category can be a "head movement" category whose engagement sub-score 222a-m represents a degree to which the head movement of the user indicates that the user is engaged in the video conference call. The engagement engine 220a-n corresponding to the head movement category can process a sequence of two or more of the decoded video frames 212 (e.g., using a trained machine learning model) to generate the corresponding engagement sub-score 222a-m. For example, the engagement sub-score 222a-m for the head movement category can be a binary value indicating whether or not the user is nodding their head in the sequence of two or more decoded video frames 212. As a particular example, the corresponding engagement engine 220a-n can process the sequence of decoded video frames 212 using a neural network that has been configured through training to identify head nods depicted in the sequence of decoded video frames 212.

In some implementations, the binary engagement sub-score 222a-m indicates whether the user nodded their head at any point in a predetermined length of time before the current time point, where the predetermined length of time is longer than the time period represented by the sequence of decoded video frames 212 processed by the corresponding engagement engine 220a-n. For example, the predetermined length of time can be five seconds, ten seconds, twenty seconds, thirty seconds, one minute, five minutes, or ten minutes. That is, even if the engagement engine 220a-n determines that the user did not nod their head in the time period represented by the sequence of decoded video frames 212, then engagement engine 220a-n can still generate a positive engagement sub-score 222a-m if the user was determined to have nodded their head at a previous execution of the engagement engine 220a-n within the predetermined length of time. For example, the engagement engine 220a-n can maintain a memory that identifies the time point at which the user was most recently determined to have nodded their head.

Another engagement category can be a "verbal cue" category whose engagement sub-score 222a-m represents a degree to which one or more verbalizations made by the user indicate that the user is engaged with the video conference call. The engagement engine 220a-n corresponding to the verbal cue category can process the decoded audio data 214 to generate the corresponding engagement sub-score 222a-m. For example, the engagement sub-score 222a-m for the verbal cue category can be a binary value indicating whether or not the user has spoken, as represented by the decoded audio data 214. In some implementations, to determine whether the user has spoken, the engagement engine 220a-n processes the decoded audio data 214 using a machine learning model that has been configured through training to process audio data and generate a model output representing a prediction of whether the audio data represents the spoken utterances of a user. In some other implementations, the engagement engine 220a-n determines whether the sound wave represented by the decoded audio data 214 exceeds a threshold amplitude for a threshold period of time and, if so, determines that the user has spoken. In some implementations, the binary engagement sub-score 222a-m indicates whether the user spoke at any point in a predetermined length of time before the current time point, where the predetermined length of time is longer than the time period represented by the decoded audio data 214. For example, the predetermined length of time can be five seconds, ten seconds, twenty seconds, thirty seconds, one minute, five minutes, or ten minutes. The engagement engine 220a-n can maintain a memory that identifies the time point at which the user most recently spoke.

Another engagement category can be a "gesture" category whose engagement sub-score 222a-m represents a degree to which one or more gestures made by the user indicate that the user is engaged with the video conference call. The engagement engine 220a-n corresponding to the gesture category can process a sequence of one or more of the decoded video frames 212 (e.g., using a trained machine learning model) to generate the corresponding engagement sub-score 222a-m. For example, the engagement sub-score 222a-m for the gesture category can be a binary value indicating whether or not the user made a gesture with one or more hands in the sequence of one or more decoded video frames 212. As a particular example, the corresponding engagement engine 220a-n can process the sequence of decoded video frames 212 using a neural network that has been configured through training to detect hand gestures depicted in the sequence of decoded video frames 212. In some implementations, the binary engagement sub-score 222a-m indicates whether the user made a hand gesture at any point in a predetermined length of time before the current time point, where the predetermined length of time is longer than the time period represented by the sequence of decoded video frames 212 processed by the corresponding engagement engine 220a-n. For example, the predetermined length of time can be five seconds, ten seconds, twenty seconds, thirty seconds, one minute, five minutes, or ten minutes. The engagement engine 220a-n can maintain a memory that identifies the time point at which the user most recently made a hand gesture.

Another engagement category can be an "interaction" category whose engagement sub-score 222a-m represents a degree to which one or more interactions by the user with the first user device indicate that the user is engaged with the video conference call. The engagement engine 220a-n corresponding to the interaction category can process the interaction data 204 to generate the corresponding engagement sub-score 222a-m. For example, the engagement sub-score 222a-m for the interaction category can be a binary value indicating whether or not the user interacted with the first user device (or a particular computer program executed by the first user device, e.g., the computer program of the video conference call) as indicated by the interaction data 204. As another example, the engagement sub-score 222a-m for the interaction category can be a sum of binary values each corresponding to a different possible interaction that the user can have with the first user device or computer program, e.g., a sum of respective binary values indicating whether the user is typing within the computer program, using a mouse to click within the computer program, or sharing their screen with other participants on the video conference call. In some implementations, the engagement sub-score 222a-m indicates whether the user interacted with the first user device or the particular computer program at any point in a predetermined length of time before the current time point, where the predetermined length of time is longer than the time period represented by the interaction data 204. For example, the predetermined length of time can be five seconds, ten seconds, twenty seconds, thirty seconds, one minute, five minutes, or ten minutes. The engagement engine 220a-n can maintain a memory that identifies the time point at which the user most recently interacted with the first user device or the particular computer program.

Another engagement category can be a "presence" category whose engagement sub-score 222a-m represents a degree to which the presence of the user in the decoded video frames 212 indicates that the user is engaged with the video conference call. The engagement engine 220a-n corresponding to the presence category can process one or more decoded video frames 212 to generate the corresponding engagement sub-score 222a-m. For example, the engagement sub-score 222a-m for the presence category can be a binary value indicating whether or not the user is identified in the decoded video frames 212. As a particular example, the corresponding engagement engine 220a-n can process the one or more decoded video frames 212 using a neural network that has been configured through training to detect human beings depicted in the one or more decoded video frames 212. In some implementations, the binary engagement sub-score 222a-m indicates whether the user has been out of frame (i.e., not present in the decoded video frames 212) for a predetermined length of time, e.g., a predetermined length of time that is longer than the time period represented by the decoded video frames 212 processed by the corresponding engagement engine 220a-n. For example, the predetermined length of time can be one second, five seconds, ten seconds, twenty seconds, thirty seconds, or one minute. The engagement engine 220a-n can maintain a memory that identifies the time point at which the user was most recently present in the decoded video frames 212.

In the event, there are multiple people in a single video stream, some implementations can perform person/face detection and then perform the "presence" analysis for each detected person.

Another engagement category can be a "gaze" category whose engagement sub-score 222a-m represents a degree to which the direction of the gaze of the user in the decoded video frames 212 indicates that the user is engaged with the video conference call. The engagement engine 220a-n corresponding to the presence category can process one or more decoded video frames 212 to generate the corresponding engagement sub-score 222a-m. For example, the engagement sub-score 222a-m for the presence category can be a binary value indicating whether or not the gaze of the user is directed towards the first user device (or towards a particular program executed by the first user device, e.g., the computer program of the video conference call). As a particular example, the corresponding engagement engine 220a-n can process the one or more decoded video frames 212 using a neural network that has been configured through training to predict the direction of the gaze of users depicted in the one or more decoded video frames 212. In some implementations, the binary engagement sub-score 222a-m indicates whether the gaze of the user has been directed away from the first user device (or away from the particular computer program) for a predetermined length of time, e.g., a predetermined length of time that is longer than the time period represented by the decoded video frames 212 processed by the corresponding engagement engine 220a-n. For example, the predetermined length of time can be five seconds, ten seconds, twenty seconds, thirty seconds, one minute, five minutes, or ten minutes. The engagement engine 220a-n can maintain a memory that identifies the time point at which the gaze of the user was most recently directed towards the first user device or the particular computer program.

After the engagement engines 220a-n generate the engagement sub-scores 222a-m, the engagement system 230 can combine the engagement sub-scores 222a-m to generate an engagement score for the user depicted in the video stream 202. For example, the engagement system 230 can determine the engagement score of the user to be equal to the maximum of the engagement sub-scores 222a-m over the period of the interaction, e.g., over the period of the videoconference call. As another example, the engagement system 230 can determine the engagement score of the user to be a sum or mean of the engagement sub-scores 222a-m over the interaction. As a particular example, the engagement system 230 can determine a weighted sum of the engagement sub-scores 222a-m, where each engagement sub-score 222a-m is weighted according to a predetermined weight corresponding to the respective engagement category.

In some implementations, the engagement sub-scores 222a-m can be positive or negative, where a negative sub-score 222a-m indicates a lower engagement with the video conference than a positive sub-score 222a-m. In these implementations, each of the weights in the weighted sum can be positive.

In some other implementations, the engagement sub-scores 222a-m can only be positive (e.g., where one or more of the engagement sub-scores 222a-m are binary). In these implementations, the respective weights for "favorable" engagement categories (i.e., engagement categories for which a higher engagement sub-score 222a-m indicates higher engagement with the video conference) can be positive, while the respective weights for "unfavorable" engagement categories (i.e., engagement categories for which a higher engagement sub-score indicates a lower engagement with the video conference) can be negative. As a particular example, each favorable engagement category (optionally excepting the facial expression category) can have the same positive weight while each unfavorable engagement category can have the same negative weight.

For instance, the facial expression category may have a weight of 1, the head movement category may have a weight of 0.2, the verbal cue category may have a weight of 0.2, the gesture category may have a weight of 0.2, the interaction category may have a weight of 0.2, the presence category may have a weight of −0.5 (i.e., penalizing the engagement score if the user is not identified in the decoded video frames 212), and/or the gaze category may have a weight of −0.5 (i.e., penalizing the engagement score if the direction of the gaze of the user is away from the first user device).

In some implementations, the weights by which the engagement sub-scores are multiplied in the weighted sum depend on the user depicted in the video stream 202. That is, different users in the video conference call can have a different set of weights in the weighted sum. For example, if the user generally has a relatively low (or high) engagement sub-score 222a-m corresponding to a particular engagement category regardless of the engagement of the user, then the server system 200 can determine to update the weight corresponding to the engagement category, e.g., by increasing the weight if the sub-score 222a-m is generally low or by decreasing the weight if the sub-score 222a-m is generally high.

As a particular example, the server system 200 (or an external system) can maintain a memory that stores the historical distributions of (i) the engagement sub-scores 222a-m for each engagement category and/or (ii) the engagement scores generated from the engagement sub-scores 222a-m. That is, the server system 200 can maintain historical data of the user across multiple different video conference calls. The server system 200 can then normalize the weights in the weighted sum according to the distributions, e.g., such that each user has the same mean engagement score across video conference calls. For example, for each engagement category, the server system 200 can update the corresponding weight for each user such that the mean weighted engagement sub-score 222a-m is the same for all users. As another example, for each engagement category, the server system 200 can determine to update the corresponding weight according to a correlation between (i) the engagement sub-scores 222a-m for the engagement category and (ii) the corresponding final engagement scores. For instance, the server system 200 can decrease the weight if the correlation is low (i.e., the engagement category generally is not indicative of the engagement of the user) and increase the weight if the correlation is high (i.e., if the engagement category generally is indicative of the engagement of the user).

In some implementations, the server system 200 executes different engagement engines 220a-n at different frequencies. That is, the server system 200 iteratively provides the latest decoded video frames 212 (and/or decoded audio data 214 and/or interaction data 204) to the engagement engines 220a-n, where the iterations for different engagement engines 220a-n occur at different frequencies. As particular examples, engagement sub-scores 222a-m for the facial expression category can be determined at a frequency of 10 Hz, engagement sub-scores 222a-m for the head movement category can be determined at a frequency of at least 15-20 Hz, engagement sub-scores 222a-m for the verbal cue category can be determined at a frequency of at least 30 Hz, engagement sub-scores 222a-m for the gesture category can be determined at a frequency of at least 10 Hz, engagement sub-scores 222a-m for the presence category can be determined at a frequency of at least 15-20 Hz, and/or engagement sub-scores 222a-m for the gaze category can be determined at a frequency of at least 15-20 Hz. Engagement sub-scores 222a-m for the presence category can be determined ad-hoc, i.e., whenever the server system 200 receives interaction data 204 identifying an interaction. These frequencies can be based on human behavior models, e.g., humans typically do not shake their heads in disagreement too fast or for too long.

When determining the engagement score for the user at a particular time point in the video conference call, the engagement system 230 can use the most recent engagement sub-score 222a-m generated for each engagement category. That is, some of the engagement sub-scores 222a-m can be more stale than others when computing the engagement score for the user. As particular examples, some of the engagement engines 220a-n can be executed with respective frequencies of 1 Hz, 10 Hz, 15 Hz, 20 Hz, or 30 Hz.

In some implementations, the server system 200 only includes a single engagement engine 220a-n that generates a single engagement sub-score 222a-m. In these implementations, the engagement score for the user depicted in the video stream 202 can be equal to the single sub-score 222a-m generated by the single engagement engine 220a-n (or equal to the single sub-score 222a-m weighted according to the historical engagement of the user, as described above).

In some implementations, the engagement system 230 generates a respective engagement score for each of multiple participants of the video conference call using respective different video streams 202 provided by the user devices of the participants. For example, the server system can process each video stream 202 in parallel to generate the respective engagement scores. By generating the engagement scores for different participants in parallel, the server system 200 can reduce the time required to generate the augmented video stream 242, ensuring that the second user devices receive the augmented video stream 242 in near-real-time, e.g., with less than a second lag, with less than a ½ second lag, with less than $1/10^{th}$ of a second lag, or with less than $1/100^{th}$ of a second lag. In certain implementations, the system monitors video streams to identify stream lag. If the system identifies stream lag, a stream offset is implemented to ensure accurate engagement analysis.

In some such implementations, the engagement system 230 can combine the respective engagement scores of the participants of the video conference call to generate a collective engagement score that represents the degree to which the participants are collectively engaged in the video conference call. For example, the engagement system 230 can determine the collective engagement score to be equal to the mean of the different engagement scores.

As another example, the engagement system 230 can determine a weighted sum of the different engagement scores, where each engagement score is weighted according to the centrality of the corresponding participant in the video conference call. For example, if the purpose of the video conference call is for a first set of participants to provide a presentation to a second set of participants, then the engagement of the second set of participants may be more important to the success of the video conference call than the engagement of the first set of participants (i.e., it is more important that the participants to whom the presentation is being given are actively engaged with the presentation). In this example, the weights for the engagement scores corresponding to the second set of participants can be higher than the weights for the engagement scores corresponding to the first set of participants when generating the collective engagement score.

After generating the respective engagement scores for the participants of the video conference call and, optionally, the collective engagement score, the engagement system 230 can generate engagement metadata 232 that is to be encoded into the video stream 202. In some implementations, the engagement metadata 232 includes each generated engagement score and, optionally, the collective engagement score. In some other implementations, the engagement metadata 232 includes only the collective engagement score.

The video stream encoder 240 can re-encode the decoded video frames 212, along with the engagement metadata 232, to generate the augmented video stream 242. Generally the video stream encoder 240 encodes the decoded video frames 212 according to the same video codec by which the video stream 202 was originally encoded. The video stream encoder 240 can also re-encode the decoded audio data 214, e.g., using the same audio codec by which the audio data of the video stream 202 was originally encoded.

In some implementations, the video stream encoder 240 also encodes other information determined by the engagement engines 220a-n into the augmented video stream 242. For example, if one of the engagement engines 220a-n identified a hand gesture made by the user (e.g., when generating the engagement sub-score 222a-m for the gesture category), then the video stream encoder 240 can encode data representing the hand gesture into the augmented video stream 242, e.g., for the second user devices to display a graphical indicator of the hand gesture.

The server system 200 can provide the augmented video stream 242 to each of the second user devices corresponding to respective other participants on the video conference call. Each of the second user devices can then display, on a user interface of the second user device, (i) the video frames of the augmented video stream 242 (e.g., which can be the same as the video frames of the original video stream 202) and (ii) one or more engagement indicators generated from the engagement metadata 232 extracted from the augmented video stream 242. The engagement indicators can identify for the participant the predicted engagement in the video conference call.

For example, in implementations in which the engagement metadata 232 includes the respective engagement score for each participant on the call, the second user device can display respective engagement indicators identifying the engagement scores for each of the other participants (i.e., each participant other than the participant using the second user device). For instance, if the purpose of the video conference call is to enable remote learning (i.e., if the video conference call includes a teacher and multiple students, e.g., elementary school students), then the teacher may wish to know how engaged each student is with the lesson, and ask questions if the attention of one or more students is lagging.

As a particular example, the engagement indicator for a particular engagement score can include the value of the engagement score itself and/or a graphical representation thereof, e.g., a fixed-length bar that is filled in proportionately with the engagement score. In some implementations, the second user device (or the server system 200, before encoding the engagement metadata 232) groups the engagement scores into categories, e.g., "low energy," "normal energy," and "high energy." For instance, the "low energy" category can include all engagement score lower than a first predetermined threshold, the "normal energy" category can include all engagement scores between the first predetermined threshold and a second predetermined threshold, and the "high energy" category can include all engagement scores higher than the second predetermined threshold. The second user device can then identify the category corresponding to the engagement score of each other participant.

As another example, in implementations in which the engagement metadata 232 includes only the collective engagement score, the second user device can display an engagement indicator for the collective engagement score, e.g., wherein the engagement indicator includes the value of the collective engagement score itself, a graphical representation thereof, or an identification of a category (e.g., "low energy," "normal energy," or "high energy," as described above) to which the collective engagement score has been assigned. Thus, if the purpose of the video conference call is for the user of the second user device to give a presentation to the other participants, then the user can get real-time feedback about how effective the presentation is at maintaining the attention of the participants (without singling out any individual participant for having low engagement). In certain embodiments, the system assigns low/normal and high energy categories to collective engagement scores by dividing a distribution of collective engagement scores from similar presentations into thirds.

In some implementations, the second user device also displays the respective engagement score of the participant using the second user device. That is, the engagement metadata 232 can include the engagement score of the participant to which the augmented video stream 242 is to be provided. Then, the participant can compare their own engagement score against the collective engagement score and/or against the respective engagement scores of the other participants.

The server system 200 can repeat the techniques described above throughout the video conference call, such that at each of multiple time points the participants of the video conference call can obtain real-time information about the current engagement of the other participants. In certain implementations, a user can provide the system with permission to determine engagement when the user has opted not to display their video feed to the some or all of the videoconference participants.

After the completion of the video conference call, in some implementations, the server system 200 can generate a video conference summary 252 that includes data representing the engagement of the participants of the video conference call.

For example, for each of one or more of the participants, the engagement system 230 can maintain, in a memory 250, each of the engagement scores of the participant generated at respective time points during the video conference call. The engagement system 230 can combine the engagement scores of the participant to generate an overall engagement score that represents an aggregate degree to which the participant was engaged throughout the video conference call. For example, the engagement system 230 can determine the overall engagement score for the participant to be equal to the mean of the engagement scores generated throughout the video conference call. The engagement system 230 can then include the respective overall engagement score of each participant in the video conference summary 252.

As another example, the engagement system can maintain, in the memory 250, each of the collective engagement scores generated at respective time points during the video conference call. The engagement system 230 can combine the collective engagement scores to generate an overall collective engagement score that represents an aggregate degree to which all of the participants were engaged throughout the video conference call. For example, the engagement system 230 can determine the overall collective engagement score to be equal to the mean of the collective engagement scores generated throughout the video conference call. The engagement system 230 can then include the overall collective engagement score in the video conference summary 252.

As another example, the engagement system can maintain, in the memory 250, the respective video stream 202 of each of the participants, and include the video streams 202 themselves in the video conference summary 252.

As another example, the engagement system can maintain, in the memory 250, a transcript of the respective video stream 202 of each of the participants. For example, the server system 200 can process the decoded audio data 214 corresponding to each participant using a trained machine learning model that is configured to perform automatic speech recognition, i.e., speech-to-text. The engagement system 230 can generate a combined transcript by combining the respective transcripts corresponding to each participant, e.g., by ordering each statement in each transcript according to a timestamp at which the statement was made. The engagement system 230 can then include the combined transcript in the video conference summary.

As another example, the engagement system 230 can identify, from the respective engagement scores and/or collective engagement scores maintained in the memory 250, one or more time points during the video conference call at which the engagement of the participants was highest. The engagement system 230 can then include data representing the identified time points in the video conference summary 252. As a particular example, the engagement system 230 can generate a respective video clip, from the video streams 202 of the participants in the video conference call, for each identified time point. As another particular example, the engagement system can generate a respective text clip representing a portion of the combined transcript corresponding to each identified time point.

In certain implementations, the system can provide at least 7 sub-scores for more than 3 participants and for more than 50 time periods where the system determines the sub-scores for each of the plurality of participants for each time period and provides the sub-scores and/or resulting collective engagement score in real time (e.g., in less than 3 seconds, less than a second or less than $\frac{1}{10}^{th}$ of a second). Furthermore, the system can simultaneously capture engagement of more than 2 participants, even while content is being projected/shared.

The video conference summary 252 can be provided to an external system for storing or further processing. For example, the video conference summary 252 can be provided to a user device for analyzing the effectiveness of the video conference call. As a particular example, the video conference summary 252 can be displayed to a participant who was giving a presentation during the video conference call, so that the participant can determine how effective the presentation was at engaging the audience.

As another particular example, the video conference summary 252 can be displayed to a user who was not able to participate in the video conference call, and the user can leverage the video conference summary 252 to learn what happened during the video conference call without watching the entire video stream 202 or reading the entire combined transcript. For instance, the user can watch the video clips (and/or read the text clips) corresponding to the time points at which the engagement was the highest, thus getting the "highlights" of the video conference call.

As discussed above with reference to FIG. 1, in some implementations, the operations described above as being performed by the server system 200 can instead by performed by a user device, e.g., the user device that captured the video stream 202.

Figure 3:
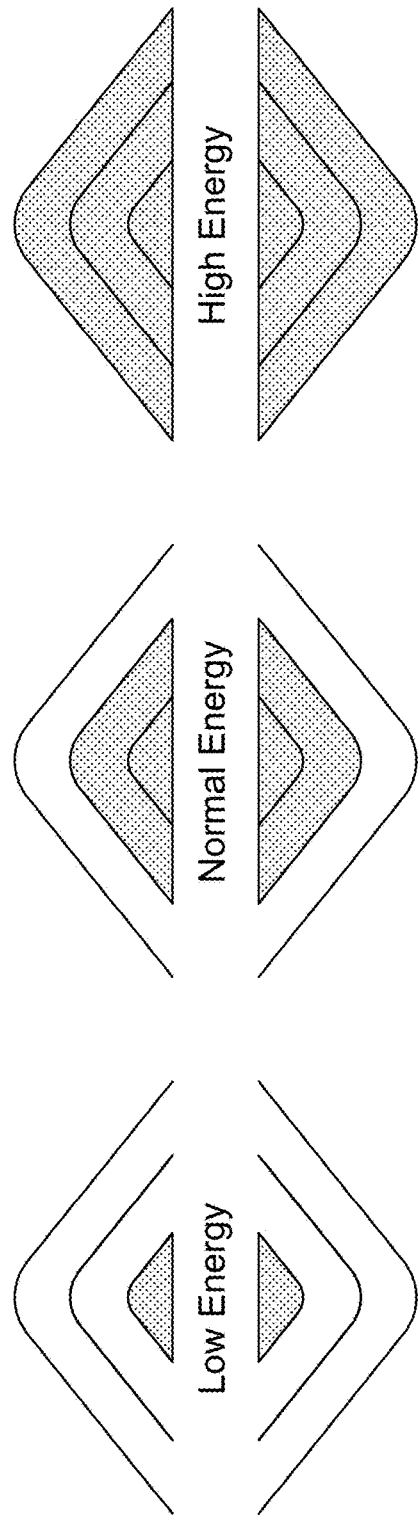
FIG. 3 illustrates example participant engagement indicators and an example participant engagement graph.
Figure 3:
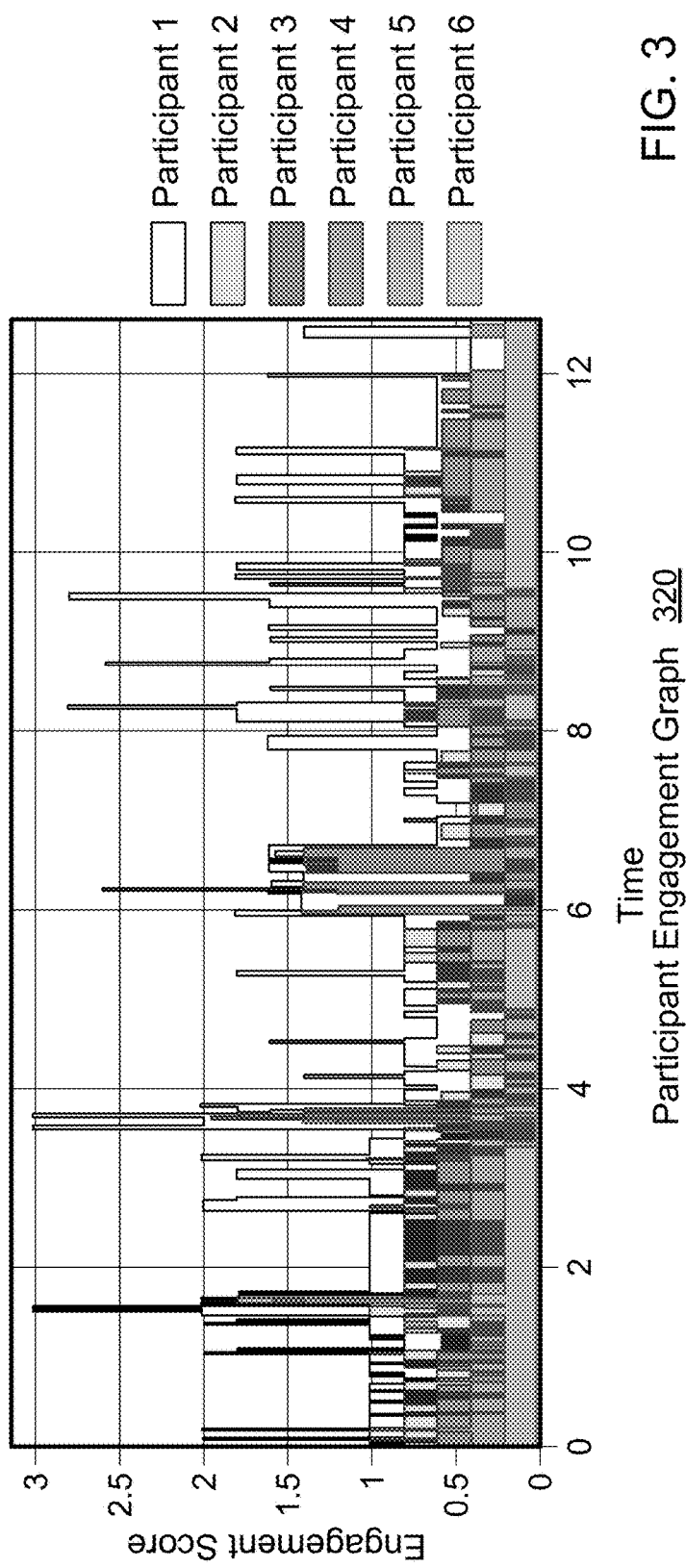

FIG. 3 illustrates example participant engagement indicators 310 and an example participant engagement graph 320.

The participant engagement indicators 310 represent the collective engagement score of all participants of a video conference call (or the engagement score of a single participant of the video conference call). In particular, the collective engagement score can be assigned to one of the following categories, "low energy," "normal energy," or "high energy," as described above. The participant engagement indicators 310 can be displayed on a graphical interface by a user device of one of the participants, and can be updated as the collective engagement score changes throughout the video conference call.

The participant engagement graph 320 graphically depicts the changing engagement scores of six participants over time during a video conference call. The graph 320 shows each participant's relative contribution to the engagement score in each window of time over a period of the video conference call. In different implementations, the window of time can take various values, e.g., 1 second, 3 seconds, 5 seconds, 10 seconds, 30 seconds, etc. The participant engagement graph 320 can be generated, e.g., after the completion of the video conference call, and a user (or an external system) can analyze the participant engagement graph 320 to determine the efficacy of the video conference call, to identify important moments in the video conference call as indicated by relatively high engagement of the six participants, and so on.

Figure 4:
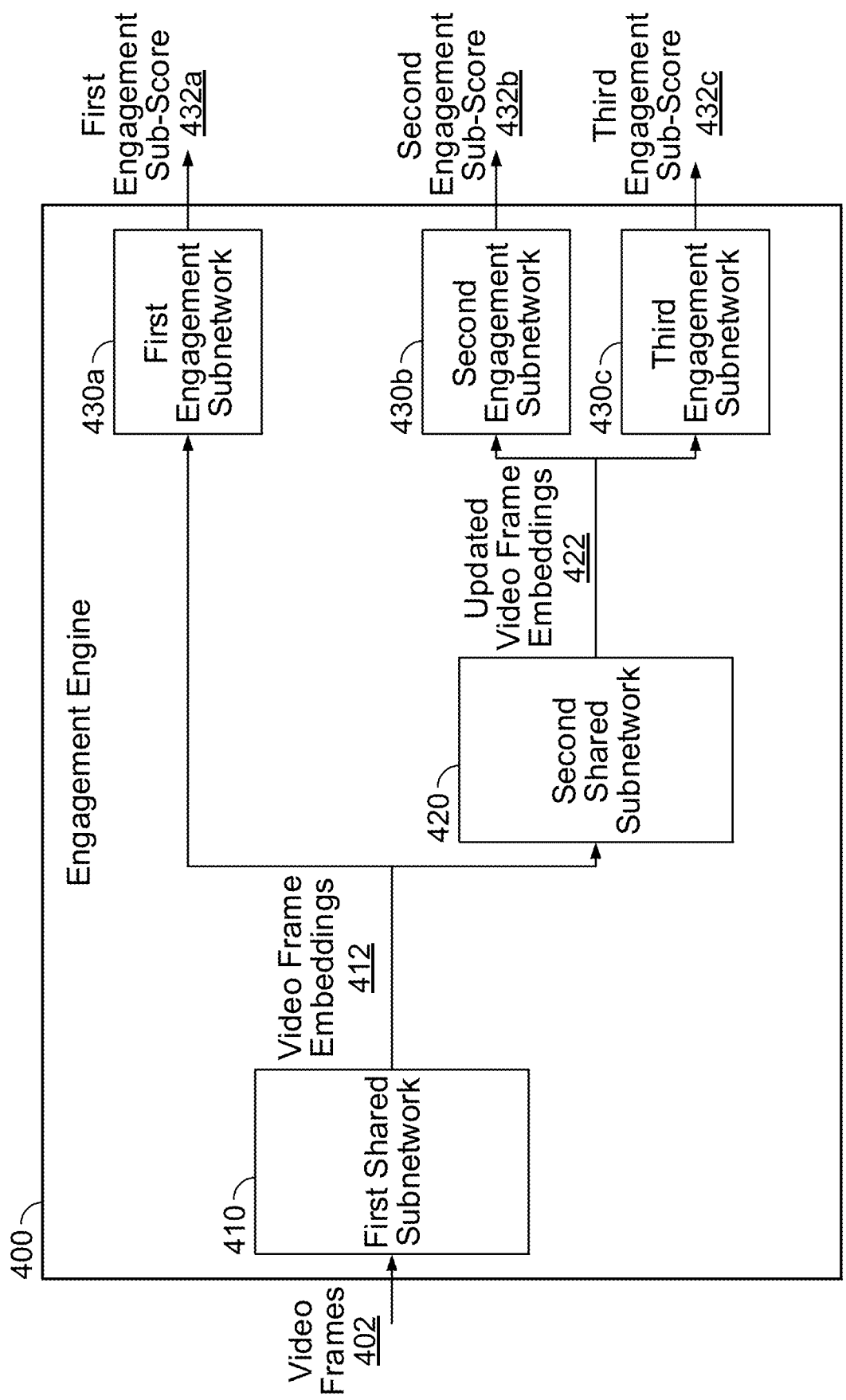
FIG. 4 is a block diagram of an example engagement engine.

FIG. 4 is a block diagram of an example engagement engine 400. The engagement engine 400 is an example of a system implemented as computer programs on one or more computers in one or more locations in which the systems, components, and techniques described below are implemented.

The engagement engine is configured to process a sequence of one or more video frames 402 that depict a participant in a video conference call, and to generate a first engagement sub-score 432a for a first engagement category, a second engagement sub-score 432b for a second engagement category, and a third engagement sub-score 432c for a third engagement category. The respective engagement categories each corresponding to a different mode by which the participant can be engaged in the video conference call. For example, the engagement engine 400 can be one of the engagement engines 220a-n described above with reference to FIG. 2.

The engagement engine 400 is configured to generate the engagement sub-scores 432a-c by processing the video frames using a single neural network. The neural network includes a first shared subnetwork 410, a second shared subnetwork 420, and three engagement subnetworks 430a-c. Each engagement subnetwork 430a-c corresponds to a respective engagement category.

The first shared subnetwork 410 is configured to process the sequence of video frames 402 and to generate a sequence of video frame embeddings 412. For example, the first shared subnetwork 410 can generate a respective video frame embedding 412 for each video frame 402 in the sequence of video frames 402. In this specification, an embedding is an ordered collection of numeric values that represents an input in a particular embedding space. For example, an embedding can be a vector of floating point or other numeric values that has a fixed dimensionality. The network architecture of a feature extractor in one implementation is a ResNet 50 architecture The first shared subnetwork 410 is called "shared" because the video frame embeddings 412 generated by the first shared subnetwork 410 can be used to generate the respective engagement sub-scores 432a-c for each of the three engagement categories. The first shared subnetwork 410 can be configured through training to extract information from the video frames 402 that is useful for each of the engagement categories. Example techniques for training the neural network are discussed in more detail below with reference to FIG. 5.

By generating video frame embeddings 412 that can be leveraged for multiple different downstream tasks, the engagement engine 400 can accomplish a higher efficiency and lower latency than if the engagement engine were required to generate different embeddings 412, using respective different embedding subnetworks, for each of the engagement categories. This improved efficiency can be particularly important in implementations in which low latency is pivotal, e.g., when the engagement engine 400 is a component of a system that is providing real-time communication to participants, e.g., a real-time video conference call.

The first engagement subnetwork 430a is configured to process the video frame embeddings 412 and to generate the first engagement sub-score 432a corresponding to the first engagement category. As a particular example, the first engagement category can be a "head movement" category that represents the degree to which the head movement of the participant indicates that the participant is engaged in the video conference call. For instance, the first engagement subnetwork 430a can include one or more Fast Fourier Transform (FFT) layers that are configured to process the sequence of video frame embeddings 412 and to generate a frequency-domain representation of the sequence. Instead or in addition, the first engagement subnetwork 430a can include one or more recurrent neural network layers that are configured to process recurrently the sequence of video frame embeddings 412. Instead or in addition, the first engagement subnetwork 430a can include one or more self-attention neural network layers that are configured to apply a self-attention mechanism to the sequence of video frame embeddings 412. The first engagement subnetwork 430a can further include one or more fully-connected neural network layers that are configured to generate the network output representing the first engagement sub-score 432a. For example, the final neural network layer of the first engagement subnetwork 430a can be a softmax layer that generates a value between 0 and 1, e.g., representing a likelihood that the user nodded their head in the video frames 402. In some implementations, the first engagement subnetwork 430a generates the first engagement sub-score 432a heuristically from the network output; e.g., the first engagement subnetwork 430a can generate a binary first engagement sub-score 432a by rounding the output of the softmax layer. In some other implementations, the first engagement sub-score 432a is equal to the network output of the subnetwork 430a.

The second shared subnetwork 420 is configured to process the sequence of video frame embeddings 412 to generate respective updated video frame embeddings 422. For example, the second shared subnetwork 420 can generate a respective updated video frame embedding 422 for each video frame embedding 412 in the sequence of video frame embeddings 412. Similarly to the first shared subnetwork 410, the second shared subnetwork 420 is called "shared" because the updated video frame embeddings 422 can be used to generate the respective engagement sub-scores 432b and 432c for the second and third engagement categories. The second shared subnetwork 420 can be configured through training to extract information from the video frame embeddings 412 that is useful for both the second and third engagement categories. For example, the second shared subnetwork 420 can include one or more convolutional neural network layers and/or one or more feedforward neural network layers that are configured to process a video frame embedding 412 and to generate the corresponding updated video frame embedding 422. As a particular example, the second shared subnetwork 420 can be a ResNet that includes one or more skip connections between respective neural network layers.

The second engagement subnetwork 430b is configured to process the updated video frame embeddings 422 and to generate the second engagement sub-score 432b corresponding to the second engagement category. As a particular example, the second engagement category can be a "facial expression" category that represents the degree to which the facial expression of the participant indicates that the participant is engaged in the video conference call. For instance, the second engagement subnetwork 430b can include one or more Fast Fourier Transform (FFT) layers that are configured to process the sequence of updated video frame embeddings 422 and to generate a frequency-domain representation of the sequence. Instead or in addition, the second engagement subnetwork 430b can include one or more recurrent neural network layers that are configured to process recurrently the sequence of updated video frame embeddings 422. Instead or in addition, the second engagement subnetwork 430b can include one or more self-attention neural network layers that are configured to apply a self-attention mechanism to the sequence of updated video frame embeddings 422. The second engagement subnetwork 430b can further include one or more fully-connected neural network layers that are configured to generate the network output representing the second engagement sub-score 432b. In some implementations, the second engagement subnetwork 430b includes two different branches of neural network layers, where a first branch is configured to generate a valence value and a second branch is configured to generate an arousal value. As described above with reference to FIG. 2, the second engagement subnetwork 430b can heuristically combine the valence value and the arousal value to generate the second engagement sub-score 432b.

The third engagement subnetwork 430c is configured to process the updated video frame embeddings 422 and to generate the third engagement sub-score 432c corresponding to the third engagement category. As a particular example, the third engagement category can be a "gaze" category that represents the degree to which the direction of the gaze of the participant indicates that the participant is engaged in the video conference call. For instance, the third engagement subnetwork 430c can include one or more Fast Fourier Transform (FFT) layers that are configured to process the sequence of updated video frame embeddings 422 and to generate a frequency-domain representation of the sequence. Instead or in addition, the third engagement subnetwork 430c can include one or more recurrent neural network layers that are configured to process recurrently the sequence of updated video frame embeddings 422. Instead or in addition, the third engagement subnetwork 430c can include one or more self-attention neural network layers that are configured to apply a self-attention mechanism to the sequence of updated video frame embeddings 422. The third engagement subnetwork 430c can further include one or more fully-connected neural network layers that are configured to generate the network output representing the third engagement sub-score 432c.

In some implementations, as described above with reference to FIG. 2, different engagement subnetworks 430a-c can generate respective engagement sub-scores 432a-c at different frequencies. For example, different engagement subnetworks 430a-c can generate respective engagement sub-scores 432a-c corresponding to different lengths of sequences of video frames 402, such that given a sequence of video frames 402 having length N, the different engagement subnetworks 430a-c execute a different number of times.

After generating the three engagement sub-scores 432a-c, the engagement engine 400 can provide the engagement sub-scores 432a-c to an engagement system, e.g., the engagement system 230 described above with reference to FIG. 2, to combine the engagement sub-scores 432a-c (and, optionally, other engagement sub-scores generated by respective other engagement engines) to generate an engagement score for the participant.

Figure 5:
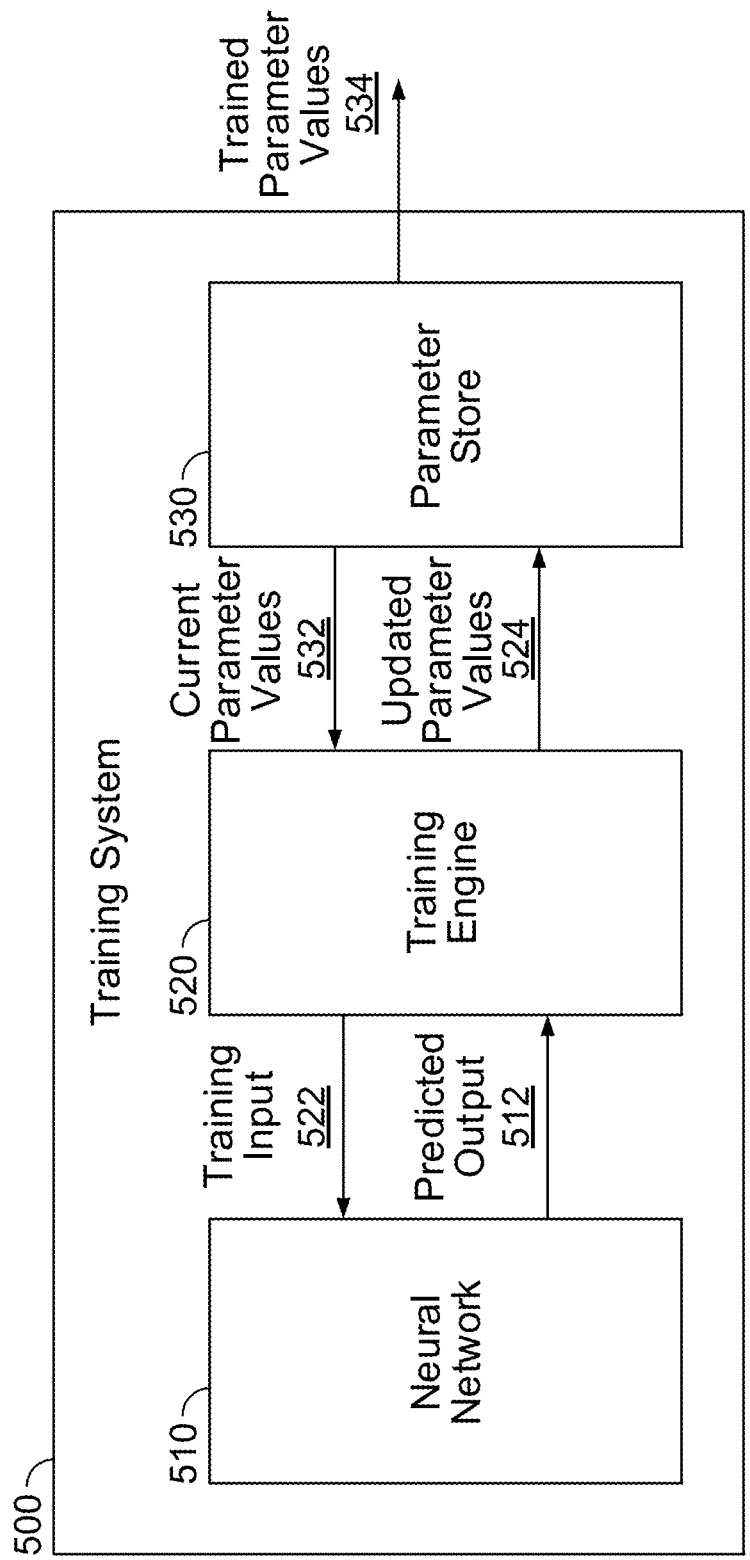
FIG. 5 is a block diagram of an example training system.

FIG. 5 is a block diagram of an example training system 500. The training system 500 is an example of a system implemented as computer programs on one or more computers in one or more locations in which the systems, components, and techniques described below are implemented.

The training system 500 is configured to train a neural network 510, e.g., the neural network depicted in FIG. 5, to process a network input representing an interaction and to generate a network output representing the predicted engagement of a participant in the interaction, where the network output represents one or more engagement sub-scores corresponding to respective engagement categories. The training system 500 includes the neural network 510, a training engine 520, and a parameter store 530.

The neural network 510 can be configured to process any appropriate type of network input to generate the network output. For example, if the interaction is a video conference call, then the network input can include (or be generated from) video frames of the video conference call and/or audio data associated with the video conference call.

The parameter store 530 is configured to store the current values 532 for the parameters of the neural network 510. The training engine 520 can obtain the current parameter values 532 from the parameter store 530, and use the current parameter values 532 to process a training input 522 using the neural network 510 to generate a predicted output 512 for the training input 522. The predicted output represents the respective engagement sub-scores corresponding to the one or more engagement categories for the interaction represented by the training input 522.

The training engine 520 can determine an error in the predicted output 512 to generate a parameter update for the neural network 510. The training engine 520 can determine the error using any appropriate technique.

For example, the training engine 520 can determine the difference between the predicted output 512 and a ground-truth output associated with the training input 522 that represents the output that the neural network 510 should generate in response to processing the training input 522. In other words, the training engine 520 can determine the error in the predicted output 512 using supervised learning. The ground-truth output can correspond to the one or more engagement categories for which the neural network 510 is configured to generate engagement sub-scores. For example, if the neural network 510 is configured to process an input representing a sequence of video frames and to generate an engagement sub-score for a head movement category, then the ground-truth output can be a binary output identifying whether or not the participant is depicted as nodding their head in the sequence of video frames. As another example, if the neural network 510 is configured to generate an engagement sub-score for a gesture category, then the ground-truth output can be a binary output identifying whether or not the participant is depicted as making a hand gesture in the sequence of video frames. As another example, if the neural network 510 is configured to generate an engagement sub-score for a gaze category, then the ground-truth output can be a binary output identifying a direction of the gaze of the participant as depicted in the sequence of video frames.

As other examples, the training engine 520 can determine the error in the predicted output 512 using one or more of unsupervised learning, self-supervised learning, or reinforcement learning.

Once the error is computed, the training engine 520 can use backpropagation and stochastic gradient descent to determine an update to the current parameter values 532 of the neural network 510, generating updated parameter values 524. After updating the parameters of the neural network, the training engine 520 can provide the updated parameter values 524 to the parameter store 530. The training engine 520 can determine multiple different updates to the parameter values throughout training using respective different batches of one or more training inputs 522.

After training is completed, the training system 500 can output the final trained values 534 of the parameters of the neural network 510. In some implementations, the training system 500 can determine to complete training after processing a predetermined number of training inputs 522. In some other implementations, the training system 500 can determine to complete training after a performance metric (e.g., prediction accuracy of a validation or testing data set) of the neural network 510 exceeds a predetermined threshold. In some other implementations, the training system 500 can determine to complete training after an incremental improvement of the performance metric of the neural network 510 across multiple training time steps drops below a predetermined threshold, i.e., after the performance of the neural network 510 is no longer significantly improving.

For example, the training system 500 can provide the trained parameter values 534 to an inference system that is configured to receive new network inputs representing new interactions, e.g., new video streams for video conference calls. In some implementations, the inference system can be deployed on a local device of a user. In some other implementations, the inference system can be deployed onto a server system, e.g., the server system 120 described above with reference to FIG. 1.

Figure 6:
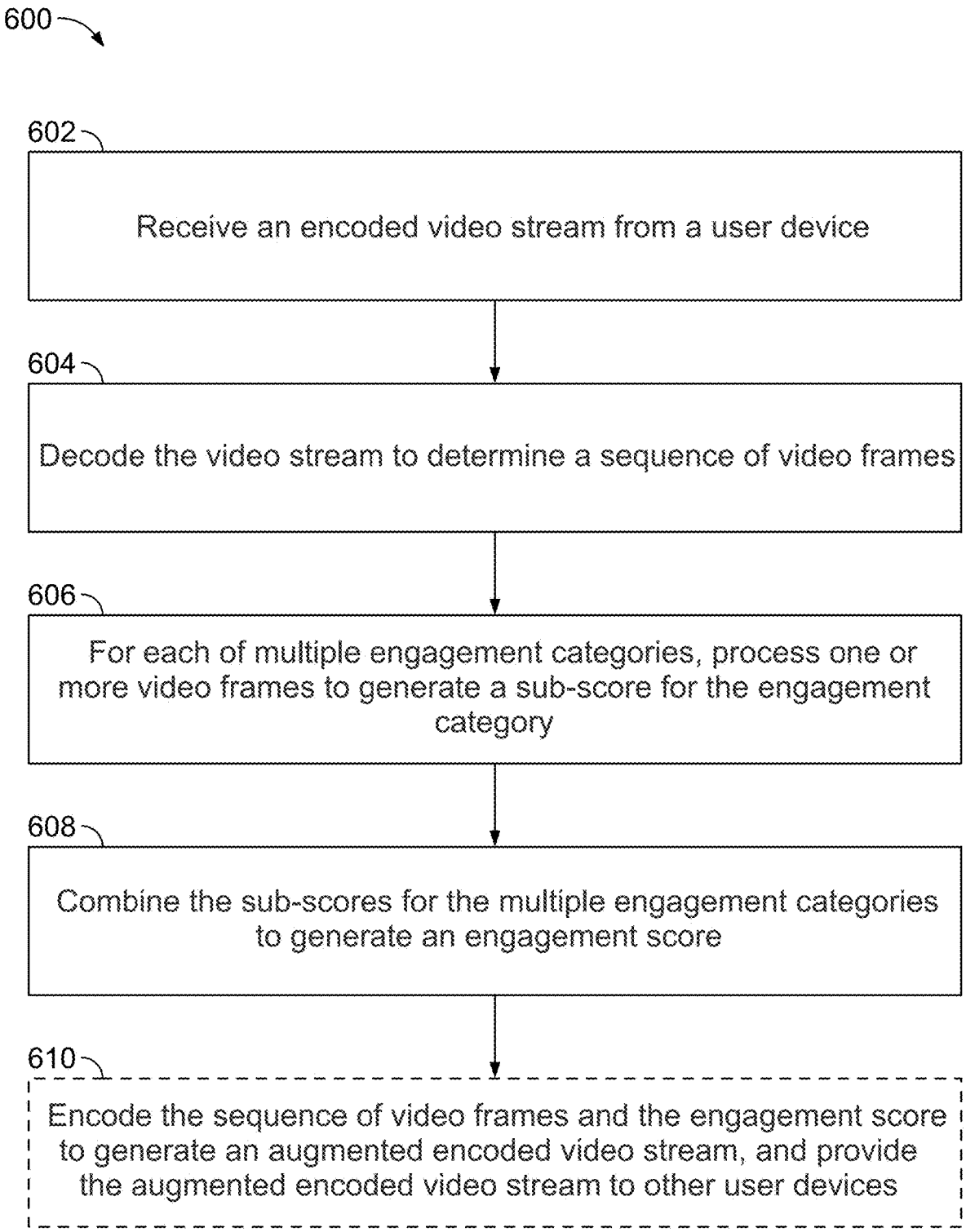
FIG. 6 is a flow diagram of an example process for generating engagement scores.

FIG. 6 is a flow diagram of an example process for generating engagement scores. For convenience, the process 600 will be described as being performed by a system of one or more computers located in one or more locations. For example, a server system, e.g., the server system 120 depicted in FIG. 1, appropriately programmed in accordance with this specification, can perform the process 600.

The system receives, from a user device of a participant in a video conference call, an encoded video stream of the participant (step 602). The encoded video stream represents an encoding of a sequence of one or more video frames.

The system decodes the encoded video stream to determine the sequence of video frames (step 604).

For each of multiple engagement categories representing respective different modes by which the participant may be engaged in the conference call, the system processes one or more respective video frames from the sequence of video frames to generate a sub-score for the engagement category (step 606).

The system combines the sub-scores for the multiple engagement categories to generate an engagement score for the participant that represents a degree to which the participant is engaged in the video conference call (step 608).

Optionally, the system encodes the sequence of video frames and the engagement score to generate an augmented encoded video stream, and provides the augmented encoded video stream to respective other user devices of other participants in the video conference call (step 610).

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network.

Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of determining an engagement score for each of a plurality of participants in a video conference call, the engagement score for each participant representing a degree to which the participant is engaged in the video conference call, the method comprising, for each of the plurality of participants:
    receiving, at a server system and from a user device of the participant, an encoded video stream of the participant, the encoded video stream representing an encoding of a sequence of one or more video frames;
    decoding the encoded video stream to determine the sequence of video frames;
    for each of a plurality of engagement categories representing respective different modes by which the participant may be engaged in the conference call, processing one or more respective video frames from the sequence of video frames to generate a sub-score for the engagement category; and
    combining the sub-scores for the plurality of engagement categories to generate the engagement score for the participant, wherein the sub-scores comprise a valence value and an arousal value, wherein the valence value and the arousal value are integer values, and the valence value and the arousal value are combined according to a predetermined mapping between the valence value, the arousal value, and the sub-score for the engagement category.

2. The method of claim 1, further comprising, for each of the plurality of participants, generating a respective engagement score at each of a plurality of time points during the video conference call.

3. The method of claim 2, further comprising, for each of the plurality of participants and after the video conference call has concluded, combining the respective engagement scores corresponding to the plurality of times points to generate an overall engagement score representing an aggregate degree to which the participant was engaged throughout the video conference call.

4. The method of claim 1, further comprising:
    combining the respective engagement scores for each of the plurality of participants to generate a collective engagement score representing a degree to which the plurality of participants are collectively engaged in the video conference call.

5. The method of claim 4, further comprising generating a respective collective engagement score at each of a plurality of time points during the video conference call.

6. The method of claim 5, further comprising, after the video conference call has concluded, combining the respective collective engagement scores corresponding to the plurality of time points to generate an overall collective engagement score representing an aggregate degree to which the plurality of participants were engaged throughout the video conference call.

7. The method of claim 1, further comprising, for each of the plurality of participants:
    encoding (i) the sequence of video frames of the participant and (ii) the engagement score for the participant to generate an augmented encoded video stream; and
    providing the augmented encoded video stream to respective user devices of the other participants of the plurality of participants.

8. The method of claim 1, wherein, for one or more of the plurality of engagement categories:
    generating the sub-score for the engagement category further comprises processing one or more of (i) audio data corresponding to the sequence of video frames or (ii) interaction data representing a user input provided by the participant to the user device of the participant.

9. The method of claim 1, wherein the server system is configured to process the sequence of video frames using a single neural network to generate respective sub-scores for at least a subset of the plurality of engagement categories.

10. The method of claim 9, wherein the single neural network comprises:

a first subnetwork that has been configured through training to process the sequence of video frames and to generate an embedding of the sequence of video frames; and a plurality of second subnetworks each corresponding to one or more respective different engagement categories, wherein each second subnetwork has been configured through training to process the embedding of the sequence of video frames and to generate the respective sub-scores for the one or more engagement categories corresponding to the second subnetwork.

11. The method of claim 1, further comprising, for each of the plurality of participants:

displaying, by the user device of the participant, one or more of (i) the engagement score of the participant or (ii) a collective engagement score representing a degree to which the plurality of participants are collectively engaged in the video conference call.

12. The method of claim 1, further comprising:

storing, by the server system, video data determined from the respective encoded video streams of the plurality of participants; and associating the video data with engagement data determined from the respective engagement scores of the plurality of participants.

13. The method of claim 1, wherein the plurality of engagement categories comprises at least two of:

a facial expression category whose sub-score is generated according to an identified facial expression of the participant, a head movement category whose sub-score is generated according to an identified head movement of the participant, a verbal cue category whose sub-score is generated according to a verbalization made by the participant, a gesture category whose sub-score is generated according to an identified gesture made by the participant, an interaction category whose sub-score is generated according to a user input provided by the participant to the user device of the participant, a presence category whose sub-score is generated according to a presence of the participant in the sequence of video frames, or a gaze category whose sub-score is generated according to an identified gaze of the participant.

14. The method of claim 1, wherein the server system generates a respective engagement score for each of the plurality of participants in parallel.

15. A system comprising one or more computers and one or more storage devices storing instructions that when executed by the one or more computers cause the one more computers to perform operations comprising determining an engagement score for each of a plurality of participants in a video conference call, the engagement score for each participant representing a degree to which the participant is engaged in the video conference call, the determining comprising, for each of the plurality of participants:

receiving, at a server system and from a user device of the participant, an encoded video stream of the participant, the encoded video stream representing an encoding of a sequence of one or more video frames;

decoding the encoded video stream to determine the sequence of video frames;

for each of a plurality of engagement categories representing respective different modes by which the participant may be engaged in the conference call, processing one or more respective video frames from the sequence of video frames to generate a sub-score for the engagement category; and combining the sub-scores for the plurality of engagement categories to generate the engagement score for the participant, wherein the sub-scores comprise a valence value and an arousal value, wherein the valence value and the arousal value are integer values, and the valence value and the arousal value are combined according to a predetermined mapping between the valence value, the arousal value, and the sub-score for the engagement category.

16. The system of claim 15, wherein the operations further comprise, for each of the plurality of participants:

encoding (i) the sequence of video frames of the participant and (ii) the engagement score for the participant to generate an augmented encoded video stream; and providing the augmented encoded video stream to respective user devices of the other participants of the plurality of participants.

17. The system of claim 15, wherein the plurality of engagement categories comprises at least two of:

a facial expression category whose sub-score is generated according to an identified facial expression of the participant, a head movement category whose sub-score is generated according to an identified head movement of the participant, a verbal cue category whose sub-score is generated according to a verbalization made by the participant, a gesture category whose sub-score is generated according to an identified gesture made by the participant, an interaction category whose sub-score is generated according to a user input provided by the participant to the user device of the participant, a presence category whose sub-score is generated according to a presence of the participant in the sequence of video frames, or a gaze category whose sub-score is generated according to an identified gaze of the participant.

18. One or more non-transitory computer storage media storing instructions that when executed by one or more computers cause the one more computers to perform operations comprising determining an engagement score for each of a plurality of participants in a video conference call, the engagement score for each participant representing a degree to which the participant is engaged in the video conference call, the determining comprising, for each of the plurality of participants:

receiving, at a server system and from a user device of the participant, an encoded video stream of the participant, the encoded video stream representing an encoding of a sequence of one or more video frames;

decoding the encoded video stream to determine the sequence of video frames;

for each of a plurality of engagement categories representing respective different modes by which the participant may be engaged in the conference call, processing one or more respective video frames from the sequence of video frames to generate a sub-score for the engagement category; and combining the sub-scores for the plurality of engagement categories to generate the engagement score for the participant, wherein the sub-scores comprise a valence value and an arousal value, wherein each of the sub-scores is weighted, further wherein at least two of the sub-scores have different weights, wherein each user has an individual weighting scheme for the sub-scores such that at least two of the users have different weighting schemes.

19. The non-transitory computer storage media of claim 18, wherein the operations further comprise, for each of the plurality of participants:
encoding (i) the sequence of video frames of the participant and (ii) the engagement score for the participant to generate an augmented encoded video stream; and
providing the augmented encoded video stream to respective user devices of the other participants of the plurality of participants.

20. The non-transitory computer storage media of claim 18, wherein the plurality of engagement categories comprises at least two of:
a facial expression category whose sub-score is generated according to an identified facial expression of the participant,
a head movement category whose sub-score is generated according to an identified head movement of the participant,
a verbal cue category whose sub-score is generated according to a verbalization made by the participant,
a gesture category whose sub-score is generated according to an identified gesture made by the participant,
an interaction category whose sub-score is generated according to a user input provided by the participant to the user device of the participant,
a presence category whose sub-score is generated according to a presence of the participant in the sequence of video frames, or
a gaze category whose sub-score is generated according to an identified gaze of the participant.

* * * * *